United States Patent [19]

Dexter

[11] 3,939,754
[45] Feb. 24, 1976

[54] OMNI-DIRECTIONAL WEAPON ARMING WIRE CONNECTION

[75] Inventor: John B. Dexter, California, Md.

[73] Assignee: The United States of America as represented by the Secretary of the Navy, Washington, D.C.

[22] Filed: Mar. 28, 1974

[21] Appl. No.: 455,758

[52] U.S. Cl................................................ 89/1.5 D
[51] Int. Cl.².......................................... F41F 5/02
[58] Field of Search...... 89/1 B, 1.5 A, 1.5 R, 1.5 F, 89/1.5 B, 1.5 D, 1.5 E; 24/201 TR, 230 AU, 230 R, 230 AL; 102/2

[56] References Cited
UNITED STATES PATENTS

| | | | |
|---|---|---|---|
| 3,418,007 | 12/1968 | Jantzen | 24/230 A |
| 3,703,844 | 11/1972 | Bleikamp | 89/1.5 D |

Primary Examiner—Verlin R. Pendegrass
Assistant Examiner—S. A. Cangialosi
Attorney, Agent, or Firm—Sciascia R. S.; R. F. Beers; P. Schneider

[57] ABSTRACT

A weapon arming wire connector for safely extracting the arming wire from the arming solenoid independent of the weapon position in the bomb rack of the aircraft. The improvement in the connector making it omni-directional includes the addition of one or more legs acting as fulcrums allowing the extraction or release of the connector from the solenoid regardless of angular displacement of the pull with approximately the same force independent of weapon position in order that the weapon may be safely jettisoned in an unarmed condition.

5 Claims, 5 Drawing Figures

OMNI-DIRECTIONAL WEAPON ARMING WIRE CONNECTION

STATEMENT OF GOVERNMENT INTEREST

The invention described herein may be manufactured and used by or for the government of the United States of America for Governmental purposes without the payment of any royalties thereon or therefor.

BACKGROUND OF THE INVENTION

This invention relates generally to weapon arming systems, and more particularly to weapon arming wire connectors which may be used with a variety of free-fall weapons to prevent accidental arming.

Airborne free-fall weapons, such as bombs, contain fuses within them which must be maintained in a safe condition until the weapon is released from the aircraft. To maintain the safe condition, the fuses are equipped with an arming device. The arming device is usually an impeller which activates the fuse after several revolutions. The arming device is inactivated by one end of the arming wire mechanically preventing the impeller from revolving. The arming wire is connected at one end to the arming device and at the other end to the aircraft through a solenoid. The solenoid is remotely controlled by aircraft personnel so that the weapon may be released in either the armed or unarmed condition.

The solenoid includes a gripping means which is biased in the closed position in the unenergized state, allowing the arming wire connector to be held in place by the gripping means of the solenoid. The arming wire connector can be connected to and disconnected from the gripping means of the unergized solenoid by applying a force sufficient to overcome the applied bias of the solenoid. The force required to disconnect the arming wire from the unergized solenoid is substantially below the force required to arm the weapon, which facilitates the loading of the weapon. If a weapon is accidentially dislodged from its hangers, the arming wire connector should readily pull free from the gripping means of the solenoid to prevent the arming of the weapon.

To deliver an armed weapon, one end of the arming wire is held firmly in place by the energized arming solenoid while the weapon is released from the aircraft. The weight of the falling weapon withdraws the other end of the arming wire from the fuse in the weapon thereby allowing the arming device on the fuse to arm the weapon.

To jettison the weapon unarmed, the arming wire connector must be released or extracted from the unenergized arming solenoid.

Known types of arming devices have not been consistently reliable for jettisoning weapons in the unarmed condition. The lack of consistency in jettisoning has been caused by the failure of the arming wire connector to disconnect from the unenergized solenoid when the force applied was not in-line, thereby unintentionally pulling the arming wire from the fuse of the weapon and arming it. To overcome this problem the omnidirectional weapon arming wire connector of the present invention was developed.

SUMMARY OF THE INVENTION

The present invention is an omni-directional weapon arming wire connector for safely releasing or extracting the weapon arming wire from the arming solenoid regardless of the angular displacement of the pull and independent of weapon position in the bomb — rack of the aircraft. The improvement in the connector making it omni-directional is the addition of one or more legs to the connector. The legs make contact with some adjacent part of the solenoid and act as fulcrums so that approximately the same forcee may be used to disconnect the arming wire connector from the unenergized arming solenoid independent of the weapon position in the event the aircraft personnel desires to release or jettison the weapon in an unarmed condition.

OBJECTS OF THE INVENTION

An object of the present invention is to provide an improved weapon arming wire connector of high reliability and low cost which may be easily fabricated to be utilized with currently used arming solenoids.

Another object of the present invention is to provide weapon arming wire connectors which can be used with all types of weapons, bomb — racks and aircraft and which can be used by all branches of the armed services.

Another object of the invention is to provide a weapon arming wire connector which is easy to install and use in present equipment.

Other objects and advantages of the present invention will become apparent from the following description and the attached drawings which illustrate two embodiments of an omni-directional weapon arming wire connector in accordance with the present invention.

DETAILED DESCRIPTION

Figure 1:
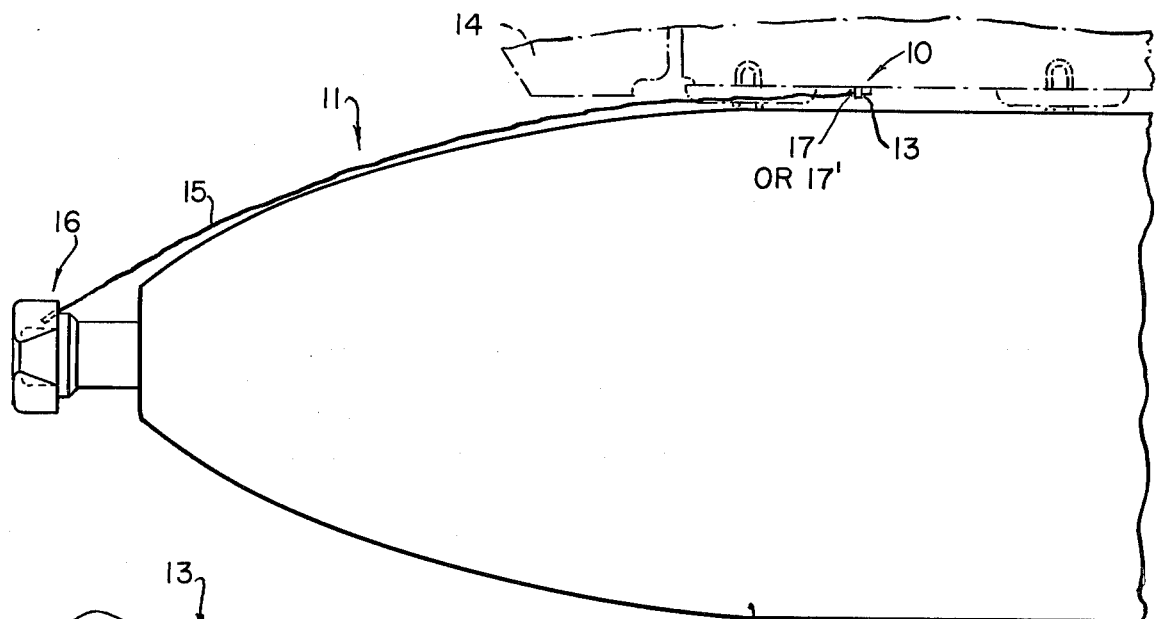
FIG. 1 is a schematic drawing of the weapon arming system using a weapon arming wire.

Reference is now made to FIG. 1 which shows the arming system with the omni-directional weapon arming wire connector 17 or 17' of this invention in position on a weapon 12. The arming system is made up of an upper unit 10 and a lower unit or arming assembly 11. The upper unit 10 (which is best seen in FIGS. 2 to 5 inclusive) is made up of a solenoid 13 fixedly secured to the underside of any conventional aircraft 14.

The lower unit 11 is made up of a flexible arming wire 15, one end of which is operably connected in any conventional manner to the fuse 16 of the weapon 12. The other end of the arming wire 15 is connected to the omni-directional weapon arming wire connector 17 or 17' of this invention.

Figure 2:
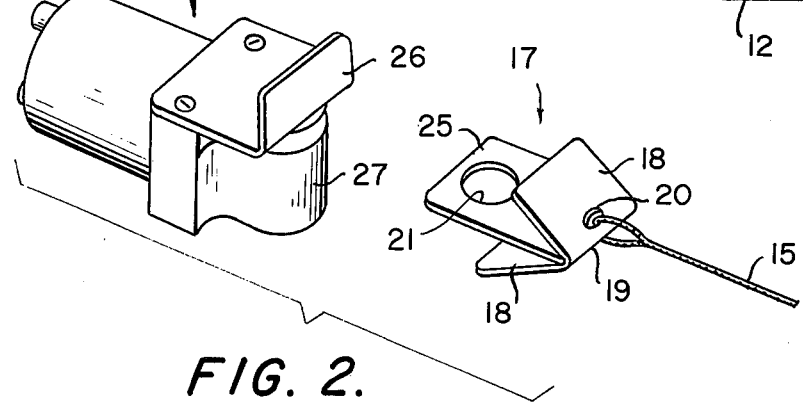
FIG. 2 is a perspective view of the arming solenoid and a metallic embodiment of the omni-directional weapon arming wire connector of this invention in a detached position.

FIG. 2 depicts the relative position of a metallic embodiment of the omni-directional weapon arming wire connector 17 of the invention to the solenoid 13 just prior to attachment. The connector 17 has a central plate 25 with a round hole 21 of approximately three-eighths of an inch centered at the end of the plate 25 away from edge 19 through which the arming wire detent pin 22 (see FIG. 3) of the solenoid 13 passes when the connector 17 is attached to the solenoid 13 (see FIG. 3). There is a round hole 20 of approximately one-eighth of an inch extending through the central plate and each of the legs 18 where the three parts are joined at edge 19 through which a loop of flexible arming wire 15 passes. The connector 17 has two plate-like legs 18 attached at the rear edge 19 of the central plate 25, each leg making an acute angle with the central plate 25 of about twenty degrees, with each leg extending away from the arming wire and being about one half the length of the central plate 25. The flexible arming wire 15 is attached to the connector 17 by looping one end through the small holes in the plates 18 and 25 at the rear edge 19 and clamping the end of the wire 15 in a conventional manner.

Figure 3:
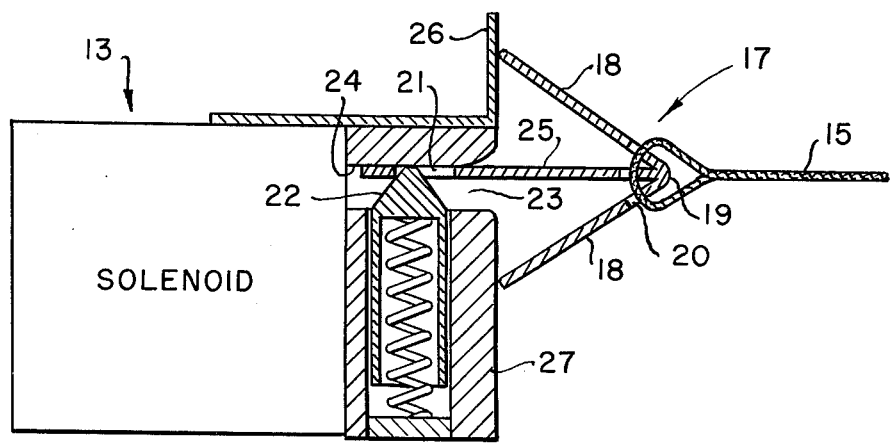
FIG. 3 is a side view in cross-section of the arming solenoid and a metallic embodiment of the omni-directional weapon arming wire connector of FIG. 2 in an attached position.

FIG. 3 shows the metallic embodiment of the omni-directional weapon arming wire connector 17 of this invention inserted into the solenoid 13. The solenoid has an arming wire recess slot 23 through which the connector 17 is inserted. Within the recess slot 23 there is an arming wire detent pin 22 forming part of the solenoid 13. The detent pin 22 is cylindrical in shape and has a cone shaped end which extends perpendicularly to and meets the wall 24 of the recess slot 23 of the solenoid 13. The detent pin 22 is biased in a conventional manner to meet the wall 24 of the recess slot 23 in the unenergized condition of the solenoid 13. In the energized condition of the solenoid, the detent pin 22 is locked against the wall 24 of the recess slot 23. The legs 18 make contact with the case 27 of the solenoid 13 and the flange or lip 26 which has been attached in a conventional manner to the side of the solenoid opposite the detent pin 22. If no flange or lip 26 is present, and the side of the solenoid case opposite the detent pin 22 is too short, as is the case with presently used solenoids, the leg 18 of the connector 13 on the flange side of the solenoid case may be omitted.

In one embodiment of the invention which was constructed, the connector 17 was formed from two metal plates. One of the plates formed the center plate 25 and one of the legs 18 by bending the plate to conform to the shape illustrated in the drawings. The other leg 18 was brazed or welded at the edge 19 to conform to the shape illustrated in the drawings. Each leg plate 18 was about one half inch long, while the center plate 25 was about one inch long. All plates had the same width of about five-eights of an inch and were made from 24 gage mild steel sheet. Approximately one-half of the connector 17 extends into the recess slot 23 of the solenoid 13 and the remaining half projects outward from the slot 23. The portion of the connector 17 projecting outward from the slot should be no greater than three-quarters of an inch to allow the connector 17 to be used with all presently used arming solenoids 13.

The connector 17 may be made from cadmium plated mild steel, brass, copper, rigid plastic materials such as polyamide (nylon), polytetrafluoroethylene or fluorinated ethylenepropylene (TEFLON) and other similar materials. The omni-directional weapon arming wire connector 17 allows the arming wire or other device to be safely released or extracted from the arming solenoid 13 regardless of the angular displacement of the weapon 12.

There are circumstances where the connector 17 of the invention can be used with only one leg 18, as mentioned above when there is no flange or lip 26.

Figure 4:
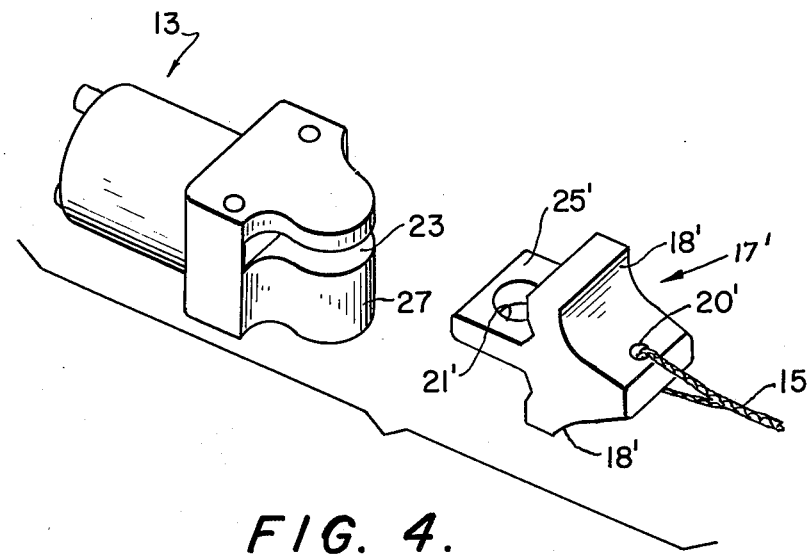
FIG. 4 is a perspective view of the arming solenoid and a molded plastic embodiment of the omni-directional weapon arming wire connector of this invention in a detached position.

FIG. 4 depicts the relative position of a one-piece molded plastic embodiment of the omni-directional weapon arming wire connector 17' of the invention to the solenoid 13 just prior to attachment. The connector 17' has a central portion 25' with a round hole 20' of approximately one-eighth of an inch extending through one end of the connector 17', through which a loop of flexible arming wire 15 passes. The connector 17' has two plate-like legs 18' which extend from the central portion 25' at an acute angle at a point about one-third of the length of the central portion 25' and extend away from the arming wire 15. There is a round hole 21' of approximately three-eighths of an inch centered at the end of the central portion 25' away from the arming wire. The arming wire detent pin 22 (see FIG. 5) of the solenoid 13 passes through hole 21' when the connector 17' is attached to the solenoid 13. The flexible arming wire 15 is attached to the connector 17' by looping one end through the small hole 20' and clamping the end to the wire 15 in a conventional manner.

Figure 5:
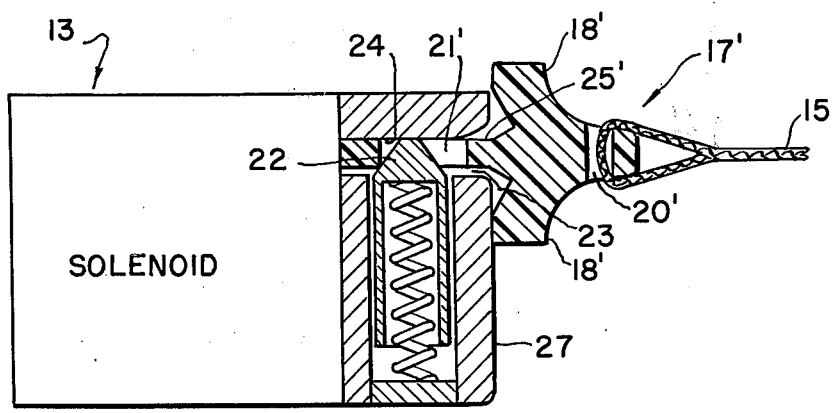
FIG. 5 is a side view in cross-section of the arming solenoid and a molded plastic embodiment of the omni-directional weapon arming wire connector of FIG. 4 in an attached position.

FIG. 5 shows the one-piece molded plastic embodiment of the omni-directional weapon arming wire connector 17' of this invention inserted into the solenoid 13. The solenoid 13 has an arming wire recess slot 23 through which the connector 17' is inserted. Within the recess slot 23 there is an arming wire detent pin 22 forming part of the solenoid 13. The detent pin 22 is cylindrical in shape and has a cone shaped end which extends perpendicularly to and meets the wall 24 of the recess slot 23 of the solenoid 13. The detent pin 22 is biased in a conventional manner to meet the wall 24 of the recess slot 23 in the unenergized condition of the solenoid 13. In the energized condition of the solenoid, the detent pin 22 is locked against the wall 24 of the recess slot 23. The legs 18' make contact with the case 27 of the solenoid 13.

In the embodiment of FIGS. 4 and 5 which was constructed, the one-piece connector 17' was formed by machining a solid piece of nylon plastic stock. The connector 17' may also be formed as a molded one-piece device of plastic, such as nylon molding resin. The overall dimensions of the plastic embodiment were approximately the same as those for the metallic embodiment.

In using the connector 17 or 17' of the invention, the fuse 16 is placed in the weapon 12 with the arming wire 15 attached to the fuse 16. The weapon 12 is attached to the underside 14 of any conventional aircraft and the connector 17 or 17' is inserted into the solenoid 13. To drop a weapon 12 capable of arming after being released from the aircraft, the solenoid 13 is energized thereby locking the arming wire detent pin 22 in the closed position in the recess slot 23. Release of the weapon places the weight of the weapon on the arming wire 15. When the solenoid 13 is energized the force required to remove the connector 17 or 17' from the solenoid 13 is much greater than the force required to remove the arming wire 15 from the fuse 16 of the weapon 12. The removal of the arming wire 15 from the fuse 16 allows the weapon 12 to arm.

To jettison or drop a weapon in the unarmed condition, the solenoid 13 is not energized. When the solenoid 13 is not energized the force required to remove the connector 17 or 17' from the solenoid 13 is much less than the force required to remove the arming wire 15 from the fuse 16 of the weapon 12. The release of the weapon 12 when the solenoid 13 is not energized allows the omni-directional arming wire connector 17 or 17' of this invention to be extracted from the solenoid 13 regardless of the angular displacement of the weapon 12. By way of example only, the force required to extract the connector 17 or 17' from the solenoid 13 when the solenoid is unenergized may be only 9–12 pounds whereas the force required to extract the connector 17 or 17' from the solenoid when the solenoid is energized may be 150 pounds. This last weight is greater than that necessary to extract the arming wire from the fuse.

The structure shown and described is illustrative and not definitive, it being understood that various changes may be made in the form, shape, arrangement and material of the various elements without departing from the spirit and scope of the invention.

What is claimed is:

1. A weapon arming wire connector for releasing a weapon having a fuse therein and
   an arming wire one end of which is attached to said fuse, said connector comprising:
   mechanical means, for attachment to the other end of said arming wire, having a central portion and two diverging legs on opposite sides of and joined to said central portion, each attached at one end to one end of said central portion, said central portion being of plate-like configuration and extending beyond the free ends of said legs which are opposite the attached ends, and having a hole therethrough also located beyond the free ends of said legs, said legs forming acute angles with the plane of said central portion and being integral therewith, the other end of the arming wire being attached to the connector near the junction between the central portion and the diverging legs.

2. A weapon arming wire connector for releasing a weapon having a fuse therein and
   an arming wire one end of which is attached to said fuse, said connector comprising:
   a pair of substantially equal-sized plates for attachment to the other end of said arming wire, said plates being attached to each other at correspondingly positioned edges to form an acute angle therebetween, the other ends of said plates being free, and
   a central plate having one end attached to and between the joined edges of said pair of plates which form acute angles with the plane of said central plate, said central plate being longer than said pair of plates and having a hole therethrough located beyond the free ends of said pair of plates, said central plate being attached to said other end of said arming wire.

3. A weapon arming wire connector for releasing a weapon having a fuse therein as described in claim 1, wherein said pair of equal sized plates make an angle of approximately 40° with each other.

4. A weapon arming wire connector for releasing a weapon having a fuse therein and
   an arming wire one end of which is attached to said fuse, said connector comprising:
   a first plate for attachment to the other end of said arming wire, and
   a side plate having one end attached to one end of said first plate to form an acute angle with the plane thereof, said side plate being shorter than said first plate, the other end of said side plate being free, said first plate having a hole therethrough at a location thereon beyond the free end of said shorter plate and a second hole therethrough near the end attached to said side plate for attachment of said arming wire.

5. A weapon arming wire connector for releasing a weapon having a fuse therein and
   an arming wire one end of which is attached to said fuse, said connector comprising:
   a molded one-piece mechanical device having a central portion attached to the other end of said arming wire, said device having a pair of plate-like legs attached to and extending away from the plane of said central portion at an angle and a hole through said central portion beyond the free ends of said pair of legs, the location of attachment of the central portion to the arming wire being at the end of the central portion opposite the end having said hole.

* * * * *